United States Patent
Vemula et al.

(10) Patent No.: US 9,649,589 B2
(45) Date of Patent: May 16, 2017

(54) OXYGEN CONCENTRATOR SYSTEM AND METHOD

(71) Applicant: LEHIGH UNIVERSITY, Bethlehem, PA (US)

(72) Inventors: Rama Rao Vemula, Bethlehem, PA (US); Shivaji Sircar, Allentown, PA (US); Mayuresh Kothare, Slatington, PA (US)

(73) Assignee: Lehigh University, Bethlehem, PA (US)

(*) Notice: Subject to any disclaimer, the term of this patent is extended or adjusted under 35 U.S.C. 154(b) by 0 days.

(21) Appl. No.: 14/769,016

(22) PCT Filed: Feb. 21, 2014

(86) PCT No.: PCT/US2014/017734
§ 371 (c)(1),
(2) Date: Aug. 19, 2015

(87) PCT Pub. No.: WO2014/130833
PCT Pub. Date: Aug. 28, 2014

(65) Prior Publication Data
US 2015/0375162 A1 Dec. 31, 2015

Related U.S. Application Data

(60) Provisional application No. 61/767,585, filed on Feb. 21, 2013, provisional application No. 61/920,496, filed on Dec. 24, 2013.

(51) Int. Cl.
*B01D 53/047* (2006.01)
*B01D 53/053* (2006.01)

(52) U.S. Cl.
CPC ......... *B01D 53/053* (2013.01); *B01D 53/047* (2013.01); *B01D 53/0473* (2013.01);
(Continued)

(58) Field of Classification Search
CPC B01D 53/047; B01D 53/0473; B01D 53/053; B01D 2256/12; B01D 2257/102;
(Continued)

(56) References Cited

U.S. PATENT DOCUMENTS 4,561,865 A 12/1985 McCombs et al.
4,756,723 A 7/1988 Sircar
(Continued)

FOREIGN PATENT DOCUMENTS

EP 1500424 A1 1/2005
WO 2006/044172 A2 4/2006

OTHER PUBLICATIONS

International Preliminary Report on Patentability mailed Aug. 25, 2015 for International Application No. PCT/US2014/017734, pp. 1-7.
(Continued)

*Primary Examiner* — Frank Lawrence
(74) *Attorney, Agent, or Firm* — Saul Ewing LLP

(57) ABSTRACT

A oxygen concentrating system comprising an adsorption column having a first end and a second end, a shell enclosing the column and defining a product gas storage space between the column and the shell, a product conduit connecting the product gas storage space to a product output point, a first conduit comprising at least one first valve having at least a first and second configuration, in the first configuration, compressed air flows from the feed point to the first end, and, in the second configuration, waste gas flows from the first end to the waste point, and a second conduit comprising at least one second valve having at least a first and second configuration, in the first configuration, the product gas flows from the product gas storage space to the second end, and, in the second configuration, the product gas flows from the second end to the storage space.

22 Claims, 6 Drawing Sheets

(52) U.S. Cl.
CPC .... *B01D 2256/12* (2013.01); *B01D 2257/102* (2013.01); *B01D 2259/401* (2013.01); *B01D 2259/4533* (2013.01); *B01D 2259/4541* (2013.01)

(58) Field of Classification Search
CPC ...... B01D 2259/401; B01D 2259/4533; B01D 2259/4541
USPC ........ 96/108, 115, 132, 143, 144; 95/96, 98, 95/105, 130; 128/204.18, 205.27
See application file for complete search history.

(56) References Cited

U.S. PATENT DOCUMENTS

| | | | |
|---|---|---|---|
| 4,959,083 A | 9/1990 | Garrett | |
| 4,964,888 A | 10/1990 | Miller | |
| 5,071,449 A | 12/1991 | Sircar | |
| 5,074,892 A | 12/1991 | Leavitt | |
| 5,286,283 A * | 2/1994 | Goodell | B60T 17/004 96/113 |
| 5,370,728 A * | 12/1994 | LaSala | B01D 53/047 95/101 |
| 5,522,150 A * | 6/1996 | Schultz | B60T 17/004 34/80 |
| 5,674,311 A * | 10/1997 | Notaro | B01D 53/047 95/122 |
| 5,827,358 A | 10/1998 | Kulish et al. | |
| 6,183,538 B1 * | 2/2001 | Naheiri | B01D 53/047 95/101 |
| 6,425,938 B1 * | 7/2002 | Xu | B01D 53/053 95/100 |
| 6,506,234 B1 | 1/2003 | Ackley et al. | |
| 6,551,384 B1 | 4/2003 | Ackley et al. | |
| 6,663,691 B2 * | 12/2003 | Yamamoto | B01D 53/0476 95/100 |
| 6,723,155 B2 | 4/2004 | Weyrich et al. | |
| 7,121,276 B2 | 10/2006 | Jagger et al. | |
| 7,294,180 B2 * | 11/2007 | Balland | B01D 53/0407 128/205.27 |
| 7,541,007 B2 | 6/2009 | Pattekar et al. | |
| 7,954,490 B2 * | 6/2011 | Jagger | A61M 16/10 128/201.25 |
| 8,226,745 B2 | 7/2012 | Siew-Wah et al. | |
| 2002/0014159 A1 | 2/2002 | Tatsumi et al. | |
| 2003/0056649 A1 | 3/2003 | Lee et al. | |
| 2005/0072423 A1 | 4/2005 | Deane et al. | |
| 2006/0288869 A1 * | 12/2006 | Warren | B01D 53/0407 95/130 |
| 2008/0134889 A1 | 6/2008 | Zhong et al. | |
| 2008/0257145 A1 | 10/2008 | Sprinkle et al. | |
| 2009/0205494 A1 | 8/2009 | McClain | |
| 2012/0255446 A1 * | 10/2012 | Eickhoff | B01D 53/047 96/111 |

OTHER PUBLICATIONS

Rao, V.R. et al., "Numerical simulation of rapid pressurization and depressurization of a zeolite column using nitrogen," Adsorption, Journal of the International Adsorption Society, May 9, 2013, pp. 1-10.

Chai, S.W. et al., "Numerical study of nitrogen desorption by rapid oxygen purge for a medical oxygen concentrator," Adsorption, May 5, 2012, pp. 1-16.

Chai, S.W. et al., "Rapid Pressure Swing Adsorption for Reduction of Bed Size Factor of a Medical Oxygen Concentrator," Industrial & Engineering Chemistry Research, vol. 50, May 26, 2011, pp. 8703-8710.

Chai, S.W. et al., "Efficiency of Nitrogen Desorption from LiX Zeolite by Rapid Oxygen Purge in a Pancake Adsorber," AIChE Journal, vol. 59, No. 2, Feb. 2013, pp. 365-368.

Rao, V.M. et al., "Highlights of Non-Equilibrium, Non-Isobaric, Non-Isothermal Desorption of Nitrogen from a LiX Zeolite Column by Rapid Pressure Reduction and Rapid Purge by Oxygen," Manuscript Draft, which published as Adsorption vol. 20, Issue 2, Oct. 24, 2013, pp. 1-9.

International Search Report dated May 9, 2014 for PCT International Application No. PCT/US2014/017734, filed Feb. 21, 2014.

* cited by examiner

OXYGEN CONCENTRATOR SYSTEM AND METHOD

RELATED APPLICATIONS

This application claims priority to U.S. Provisional Application No. 61/767,585, filed Feb. 21, 2013, and U.S. Provisional Application No. 61/920,496, filed Dec. 24, 2013, both of which are incorporated by reference in their entirety.

FIELD OF INVENTION

The present invention relates generally to an oxygen concentrator system and method, and more particularly, to an oxygen concentrator system and method that uses rapid pressure swing adsorption.

BACKGROUND

One of the recent commercially successful applications of Pressure Swing Adsorption (PSA) technology for bulk gas separation is direct production of 1-10 sl/m of ~90% $O_2$ from a compressed air stream for medical use by patients with Chronic Obstructive Pulmonary Disease (COPD) and other lung disorders. Rapid pressure swing adsorption (RPSA) processes employing total cycle times ($t_c$) of less than ten seconds are generally employed for this application. Pelletized, $N_2$ selective LiX or LiLSX zeolite is often used as the preferred air separation adsorbent in these RPSA systems.

There are several commercial designs of RPSA Medical Oxygen Concentrators (MOC) employing various PSA process schemes for portable or stationary home use. Generally, the key design goals for a MOC are (a) reduction of the bed size factor [BSF, total amount of adsorbent in the unit/ton per day of oxygen production rate, (lbs/TPD $O_2$)] which lowers adsorbent inventory resulting in a more compact and light weight unit, (b) enhancement of percentage $O_2$ recovery R by the process [amount of $O_2$ in product gas/amount of $O_2$ in feed air per cycle×100(%)] in order to decrease the air compressor size and power which result in lighter unit and longer battery life (portable units), and (c) assembly of a compact, light-weight and easy to operate unit.

A classical four-step "Skarstrom PSA" cycle or some variation thereof is usually adapted for use in these RPSA schemes. The typical steps include (i) selective adsorption of $N_2$ from compressed air by flowing air at a super-ambient adsorption pressure ($P_A$) over a packed column of the zeolite to produce an $O_2$ enriched effluent gas which is partly withdrawn as the product gas, (ii) counter-current depressurization of column to a near ambient final desorption pressure level ($P_D$), (iii) counter-current back purge of the column at $P_D$ with a part of the $O_2$ enriched product gas, and (iv) re-pressurization of column from $P_D$ to $P_A$ using either fresh compressed air (co-current) or a part of the $O_2$ enriched product gas (counter-current) or both. The cycle is then repeated. The $N_2$ enriched column effluent gases from steps (ii) and (iii) are wasted.

The conventional approach to reduce the BSF is to reduce the total cycle time ($t_c$) of the RPSA system in order to increase the cyclic frequency of operation and hence, enhance the net rate of $O_2$ production. A higher $O_2$ recovery is generally obtained by preserving a portion of the air-like void gas in the column at the end of step (i) by using it to partially pressurize a companion column (pressure equalize) before step (ii) begins in order to reduce the loss of void gas $O_2$ during step (ii). The amount of back purge gas is also minimized while maintaining the product gas purity in order to reduce BSF and increase $O_2$ recovery.

At least two parallel adsorbent columns are typically needed in a PSA system to accommodate the pressure equalization step. At least two columns are also necessary to produce a continuous product stream so that when one column is undergoing step (i), the companion column carries out steps (ii)-(iv). However, synchronized control of operation of two columns in a rapid cycling situation tends to be difficult and subject to malfunction. A product buffer tank is often necessary for smoothing out product gas flow rate and composition.

Therefore, a need exists for a smaller, more efficient device to facilitate mobility and travel. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

One aspect of the invention is a compact, light-weight, single-column oxygen concentrator system. In one embodiment, the system comprises: an adsorption column containing an adsorbent, the column having a first end and a second end; a shell enclosing the column and defining a product gas storage space between the column and the shell; a product conduit operatively connecting the product gas storage space to a product output point; a first conduit operatively connecting the first end of the column to a feed point, and the first end to a waste point, the first conduit comprising at least one first valve having at least a first and second configuration, in the first configuration, compressed air from the feed point flows to the first end, and, in the second configuration, waste gas flows from the first end to the waste point; a second conduit operatively connecting the second end of the column to the product gas storage space, the second conduit comprising at least one second valve having at least a first and second configuration, in the first configuration, the product gas flows from the product gas storage space to the second end, and, in the second configuration, the product gas flows from the second end to the product gas storage space.

In one embodiment, the system further comprises a process controller configured for controlling the first and second valves. In one embodiment, the process controller is configured to execute the following steps: (a) configuring at least one of the first or second valves in its respective first configuration to pressurize the column; (b) configuring the first valve in its first configuration and the second valve in its second configuration to feed compressed air into the column, thereby producing product gas which flows into the storage space through the second conduit; (c) configuring the first valve in the second configuration to depressurize the column by venting waste gas from the column to the waste point; (d) configuring the second valve in the first configuration to purge the column by flowing product gas through the second end of the column and venting waste from the column to the waste point; and (e) reiterating steps (a)-(d). During this cycle, product gas may be withdrawn essentially continuously or intermittently from the system.

Another aspect of the invention is method of operating the oxygen concentrator system of the present invention with a short cycle time to reduce the size of the adsorbent bed and thus the size and energy requirements of the system. In a preferred embodiment, the system has an adsorption column containing an adsorbent and having a first end and a second end, the column being enclosed by a shell to define a product gas storage space between the column and the shell, and the method comprises at least the steps of: (a) pressurizing the column with at least one of compressed air or product gas from the storage space; (b) feeding compressed air into the column thereby producing product gas from the second end which flows into the storage space; (c) depressurizing the column by venting waste gas from the column; (d) purging the column by flowing product gas into the second end of the column and venting waste gas from the first end; and (e) reiterating steps (a)-(d). During this cycle, product gas may be withdrawn essentially continuously or intermittently from the system.

Major advantages of a single adsorber RPSA process design include compact size, fewer number of switch valves, and easier process control due to the absence of synchronized operation of two or multi-column systems. This introduces more flexibility in selection of individual step times of the RPSA process so that each step can be operated more efficiently. Furthermore, the present design permits a continuous product withdrawal which is preferred over pulsed product flow offered by many commercial portable units.

The system may also be connected to an existing compressed air source through a "snap on" connector for supply of feed air needed for steps (a) and (b). Thus, the device provides a truly compact, light-weight & portable apparatus for supply of (90%+) medical oxygen for individual breathing when needed since no dedicated compressor is used in the system and the size and weight of the adsorber system is significantly reduced. The device will be suitable for use in hospitals, cruise liners, air liners, remote medical facilities, etc, where a compressed air line is usually available. Alternatively, a single air compressor may be used to supply air to a number of MOC units of the present design.

DETAILED DESCRIPTION

Figure 1:
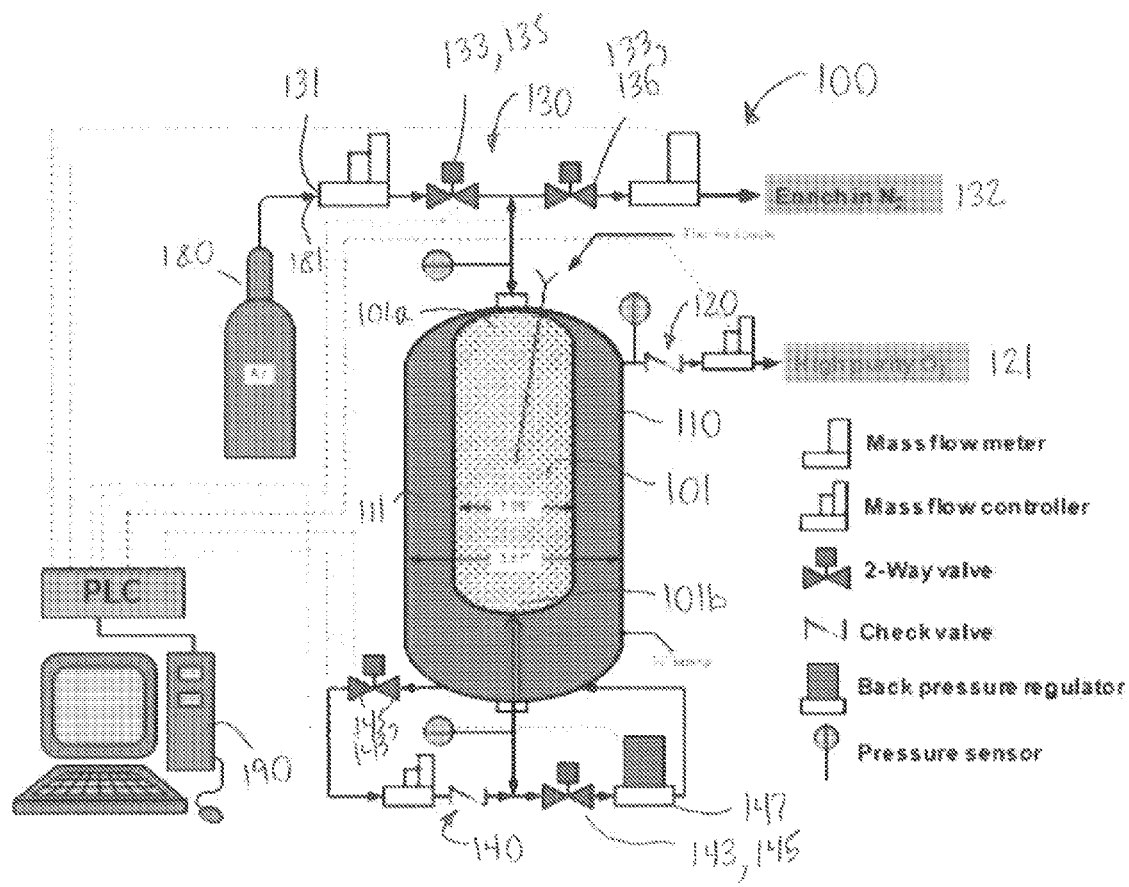
FIG. 1: Schematic drawing of single-column RPSA process system of the present invention.

Referring to FIG. 1, one embodiment of the oxygen concentrating system 100 of the present invention is shown. The oxygen concentrating system 100 comprises: an adsorption column 101 containing an adsorbent (not shown), the column having a first end 101a and a second end 101b; a shell 110 enclosing the column and defining a product gas storage space 111 between the column and the shell; a product conduit 120 operatively connecting the product gas storage space 111 to a product output point 121; a first conduit 130 operatively connecting the first end 101a of the column to a feed point 131, and the first end 101a to a waste point 132, the first conduit comprising at least one first valve 133 having at least a first and second configuration, in the first configuration, compressed air 180 from the feed point flows to the first end, and, in the second configuration, waste gas flows from the first end to the waste point; a second conduit 140 operatively connecting the second end 101b of the column to the product gas storage space 111, the second conduit comprising at least one second valve 143 having at least a first and second configuration, in the first configuration, the product gas flows from the product gas storage space to the second end, and, in the second configuration, the product gas flows from the second end to the product gas storage space.

In one embodiment, the system 100 further comprises a process controller 190 configured for controlling at least the first and second valves. In one embodiment, the process controller is configured to execute the following steps: (a) configuring at least one of the first or second valves in its respective first configuration to pressurize the column; (b) configuring the first valve in its first configuration and the second valve in its second configuration to feed compressed air into the column, thereby producing product gas which flows into the storage space through the second conduit; (c) configuring the first valve in the second configuration to depressurize the column by venting waste gas from the column to the waste point; (d) configuring the second valve in the first configuration to purge the column by flowing product gas through the second end of the column and venting waste from the column to the waste point; and (e) reiterating steps (a)-(d).

Product gas is withdrawn from the product gas storage space 111. In one embodiment, the product gas is withdrawn essentially continuously. As used herein, essentially continuously means that product gas can be withdrawn even if the system in at a point in the cycle when product gas is not being produced. In other words, during steps (a), (c), and (d) product gas can be withdrawn from the system. The system provides for essentially continuous withdraw by virtue of the cycle being short enough that pressure can be maintained in the product gas storage space even while the system is being purged. Additionally, in one embodiment, the product withdraw conduit is separate from the first and second conduits which are used in cycling the system. Consequently, the withdraw of product gas from the system is somewhat independent of the cycle. In another embodiment, the product gas is withdrawn intermittently.

The system 100 of the present invention lends its self to a compact and efficient design which in turn makes the system more portable by reducing its size and battery/energy requirements. Specifically, Applicants have discovered a number of key design variables that impact the size and efficiency the design. For example, one key design variable is the Bed Size Factor (BSF) (described above). Lower BSF translates into a smaller, more compact, and lighter-weight MOC device. The BSF can be reduced by lowering the total cycle time ($t_c$, seconds) of the RPSA process. Applicants have discovered that a total cycle time of <10 seconds, which is lower than conventional PSA processes, significantly reduces BSF, and a total cycle of about 3 to about 6 seconds, tends to provide optimum BSF values. It is therefore important that the cycle times of four steps (a)-(d) of the over-all RPSA system be short. In particular, the times for column pressurization ($t_p$, seconds) and depressurization ($t_d$, seconds) are preferably, although not necessarily, less than 1 second, and more preferably less than 0.5 seconds for optimum operation of the compact process design.

The adsorbent particle size ($d_p$, micron) is also a key variable in determining the efficiency of nitrogen desorption by oxygen purge (step (d) of the cycle). Applicants have found that column pressurization and purge times tend to be minimized with an adsorbent particle size of 300-1000 micron. For example, a particle size of 300-1000 micron can lead to both $t_p$ and $t_d$ values of less than 0.5 seconds. Preferably, although not necessarily, the particle size is 300-700 micron.

Yet another key parameter is the length to column diameter (L/D) ratio of the column as it affects the duration of pressurization and depressurization steps. It has been observed that the L/D should be less than 2.5 to lower the pressurization and depressurization times below 0.4 s. For example, in one embodiment, the column has a length to diameter ratio between about 0.3 and about 2.5.

Applicants have found that by optimizing the identified key parameters above, short cycle times and thus low BSF can be achieved, thereby reducing the size and the energy demands of the system. In one embodiment, steps (a)-(d) are performed in about 3 to 6 seconds. In one particular embodiment, step (a) is performed in less than 1 second, and, in a more particular embodiment, in less than 0.5 seconds. In one particular embodiment, step (b) is performed in about 0.5 to 2 seconds. In one particular embodiment, step (c) is performed for at least 1 second, and, in a more particular embodiment, for at least 1.5 seconds. In one particular embodiment, step (d) is performed for at least 1 second.

The various pressures in the column and storage space can be optimized for a particular application. Applicants have found that suitable results have been obtained by pressurizing the column in step (a) to about 2 to about 6 atm, and, more particularly, to about 3 to about 5 atm. In this respect, as described below, it is generally preferable, although not necessary, to pressurize the column using product gas from the storage space. Suitable results have been obtained when the pressure in the product storage space between about 2 to about 5 atm, and, more particularly, between about 2 and about 3 atm. In one embodiment, the pressure is maintained in part using a back pressure regulator 147 as shown in FIG. 1. is part of the second conduit for controlling pressure in the storage space 111.

The adsorbent may be any known $N_2$ selective molecular sieve. In one embodiment, the adsorbent comprises $N_2$ selective zeolite. In one particular embodiment, the zeolite comprises pelletized LiX zeolite, and, more particularly, bound particles of LiX zeolite crystals having a particle diameter of about 300 to about 1000 micron, and even more particularly, a diameter of about 300 to about 700 micron.

In one embodiment, the column also contains a desiccant at the first end. Suitable desiccants include, for example, alumina, silica gel, or NaX, just to name a few. Generally, a particle diameter of at least 1 mm is preferred, but not necessary.

In one embodiment, the first conduit comprises a quick connect 181 at the feed point. This enables the system 100 to be connected to an existing compressed air source 180 through a 'snap on' connector for supply of feed air needed for steps (a) and (b). Thus, the device provides a compact, light-weight & portable apparatus for supply of (90%+) medical oxygen for individual breathing when needed since no dedicated compressor is used in the system and the size and weight of the system is significantly reduced. The device is suitable for use in hospitals, cruise liners, air liners, remote medical facilities, etc, where a compressed air line is usually available. Alternatively, a single air compressor may be used to supply air to a number of MOC units of the present design.

It should be understood that the first and second valves may each comprise one or more valves. For example, as shown in FIG. 1, the at least first valve 133 of the first conduit 130 comprises two valves, 135, 136. Valve 135 controls the feed flow between the feed point and the first end of the column, and valve 136 controls the waste gas flow from the first end of the column to the waste point. Likewise, the at least one second valve 143 of the second conduit 140 in the embodiment of FIG. 1 has two valves, 145, 146. Valve 145 controls the flow of product gas from the storage space to the column, while the valve 146 controls the flow of product gas from the column into the storage space. In one embodiment, the first and second valves have a valve constants (Cv) larger than 1.5. Additionally, in one embodiment, the product conduit comprises a check valve. Although FIG. 1 shows one embodiment of the system, it should be understood that other valve configurations and valve constants may be obvious to one of skill in the art in light of this disclosure.

As described above, in one embodiment, the process controller (PC) controls the actuation of one or more valves in the system to control the pressure of the column and product storage space, and to control the cycle times. The PC may rely on different parameters for controlling the valves and performing the cycle described above. For example, the PC may actuate the valves based on time or pressure in the column or storage space or a combination of time and pressure.

In one embodiment, the system of FIG. 1 has a BSF of about 30 to about 60 lbs/TPD O2, an R value of 25-35%, a cycle time of steps (a)-(d) of 3-8 seconds, and produces at least about 90% O2 enriched product gas.

The following non-limiting example illustrates the invention and shows its advantages over conventional RPSA systems.

Example 1

An experimental system was constructed according to the schematic of FIG. 1. It consisted of a single adsorbent column (diameter=4.98 cm, Length=12.7 cm, containing 148.7 gms of LiLSX) surrounded by a coaxial gas storage space (volume=1.54 sl) which was used to store the $O_2$ enriched effluent gas from step (i). The column length was comparable to that of the mini-adsorber. Parts of the stored gas were used in step (iii) and (iv) of the process if required, and a part was continuously withdrawn as the product gas through a separate port. The adsorbent was obtained from the same batch that was used in the mini-adsorber. It was used as-received ($d_p$=200–600 μm) after thermal regeneration at ~350° C. under dry $N_2$ flow. The helium void of the adsorber was 1.65 cc/g. The scale-up factor was ~140.

In the specific embodiment of the system 100 of FIG. 1, the locations of different valves is shown [four two-way ½ inch ½ inch solenoid ($C_v$=4), and one check], mass flow meters and controllers, pressure sensors and controller. A PLC (Eaton Corp) was employed for cycle times setting and process control. An Omega data acquisition system was used for data measurement, collection and storage in an integrated computer. The transient adsorbent temperature was measured using a ¹⁄₁₆ inch exposed-tip thermocouple located at the center point inside the adsorber. A $ZrO_{2000}$ continuous analyzer using an $O_2$ selective membrane (Manufactured by ALPHAOMEGA Instruments) was used to continuously measure the $O_2$ concentration of the product gas, and the effluent steams during steps (ii) and (iii). The pressure of the gas storage tank ($P_s$) cyclically increased and decreased during the RPSA cycle, but always maintaining a super-ambient pressure level in the tank.

The unit was capable of producing a continuous stream of 90% $O_2$ from a compressed air gas source employing a total cycle time of 2.5 seconds or more. It is fully instrumented for measurement of process performance by operating it in a continuous manner. It can be used for process optimization as well as for comparative performance studies of different air separation adsorbents.

Cyclic steady state runs were conducted using a synthetic air (21% $O_2$+79% $N_2$) feed gas with and without ~1% Ar and a product gas containing 90±1.0% $O_2$ was continuously produced. A four-step Skarstrom-like PSA cycle described earlier was employed. Column pressurization (step iv) was carried out using either (a) compressed feed air or (b) a part of the $O_2$ enriched product gas from step (i). The adjustable variables were feed air pressure, flow rates for feed, product and back purge gases, and times for individual process steps and total cycle. Cyclic steady state was usually reached after 50 cycles of operation. Only those runs where the over-all and component ($O_2$) mass balances between inlet and outlet flow streams closed within ±5.0% were accepted. The unit was capable of continuously supplying 1-10 sl/m~90% $O_2$ product, which was comparable or better than the supply rate of a typical commercial unit.

The following cyclic steady state performance data were studied:
(a) Bed size factor and $O_2$ recovery as functions of total cycle time
(b) Transient cyclic adsorber inlet and outlet, and product buffer tank pressures
(c) Transient cyclic adsorbent temperature at the center of the column
(d) Transient cyclic product $O_2$ concentration and flow rate
(e) Effect of argon in feed air on RPSA process performance One example of the BSF and R vs $t_c$ plot measured using the scaled-up RPSA unit producing a continuous stream of ~90% $O_2$ from compressed air (21% $O_2$+79% $N_2$) is given in FIG. 2. The conditions of operation are given in the Figure. Performances for both modes (a) and (b) of column pressurization are shown. Mode (b) (product pressurization) of operation provides superior performance (lower BSF and higher R) than mode (a) (feed pressurization) at all cycle times. The BSF-$t_c$ plot exhibits a minimum thus indicating that the cycle time cannot be decreased indefinitely in order to lower BSF. The net $O_2$ production rate at the minimum was 1.6 sl/m and its purity was 90.5% $O_2$. The corresponding $O_2$ recovery was ~27%.

Figure 2:
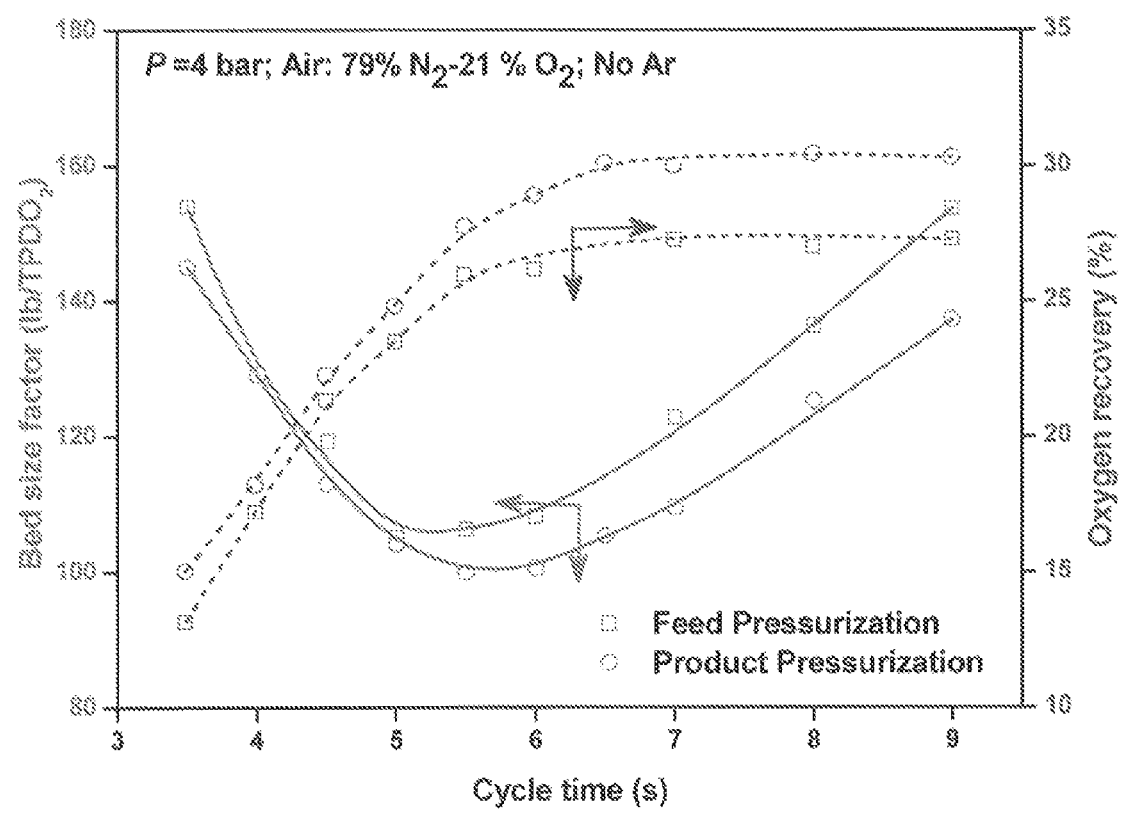
FIG. 2: Plots of BSF and O2 recovery vs total cycle time at PA=4 bar, PD~1 bar, dp=200-600 μm, measured using the scaled-up single column unit of FIG. 1.

Nevertheless, FIG. 2 shows that the scaled-up RPSA unit using the novel design and operating under mode (b) could deliver a BSF of ~100 lbs/TPD $O_2$ and a R of ~27% when the total cycle time is ~3-8 seconds and adsorption pressure was 4 bar. The unit was capable of continuously producing ~1.6 sl/m of 90% $O_2$. These performance numbers indicate that the novel concept can potentially reduce the adsorbent inventory of an MOC by a factor of ~2-3 while offering similar or ~10% higher $O_2$ recovery (proportional decrease in air compressor size and power) vis a vis a conventional MOC system. It should also be noted from FIG. 2 that a higher $O_2$ recovery of ~30% can be achieved by the present design, if desired, with a somewhat higher BSF (~125 lbs.TPD), which is still a factor of ~2 less than that of a commercial unit. Thus there is a large flexibility in the operation of the RPSA unit of FIG. 1.

It should be noted that superior performance of a PSA process using product pressurization vis a vis feed pressurization was reported earlier by Knaebel et al who carried out a limited numerical PSA model analysis of this issue for binary $CH_4$—$H_2$ separation using conventional, long PSA cycle-time formats [total cycle time ~80 s (feed pressurization), ~180 s (product pressurization)] and activated carbon as an absorbent.[10] This paper experimentally demonstrates a similar behavior for a RPSA cycle using total cycle times of 3-8 s for the first time.

Figure 3:
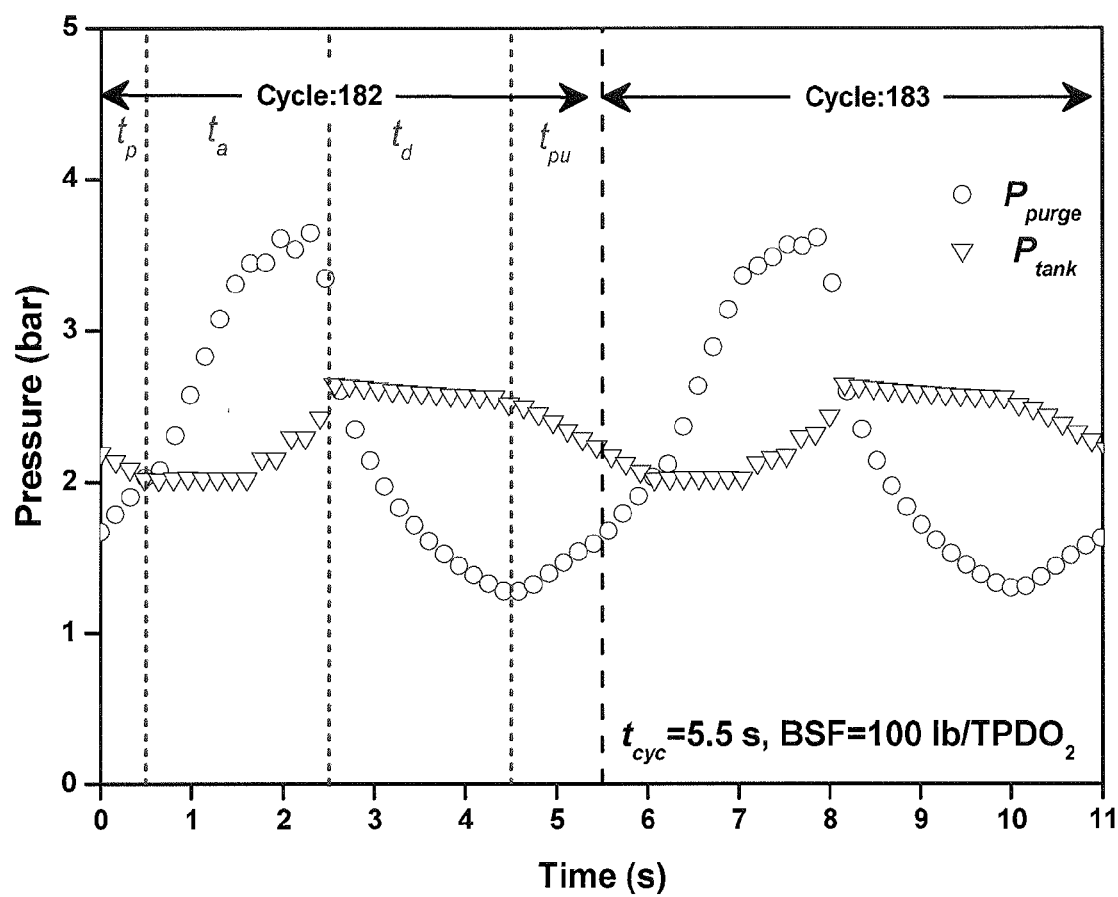
FIG. 3: Purge inlet (Ppurge), and product storage tank (Ptank) pressure profiles for two consecutive cycles during steady state operation at the minimum BSF condition (product pressurization) of FIG. 2.

FIG. 3 reports the cyclic, steady-state product tank and purge gas inlet pressures as functions of time (t) during two consecutive cycles when the BSF was at minimum (product pressurization case) and the total cycle time ($t_c$) was 5.5 seconds (see FIG. 2). The times for the individual steps of the process (pressurization=$t_p$, adsorption=$t_a$, depressurization=$t_d$, product purge=$t_{pu}$) are also marked in the Figure. The tank pressure remains substantially super-atmospheric (>2.3 bar) during the entire cycle which guarantees that the product can be continuously withdrawn above ambient pressure and delivered to an user located at a reasonable distance. On the other hand, higher tank pressure translates to larger purge gas inlet pressure which is also cause of lower recovery and larger BSF. Consequently, there is room for further improving the performance of the present RPSA system by fine tuning the mechanical designs (valve, piping, etc).

Figure 4:
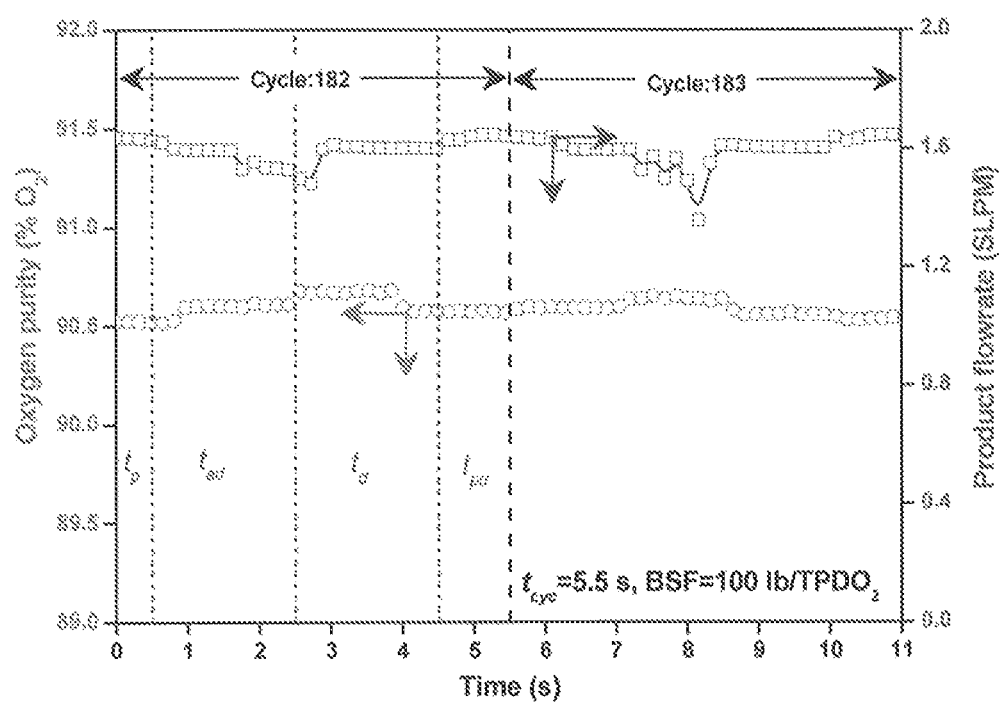
FIG. 4: Product oxygen purity and flow rate profiles for two consecutive cycles during steady state operation at the minimum BSF condition (product pressurization) of FIG. 2.

FIG. 4 shows the net $O_2$ product flow rate (sl/m) and composition (%) for two consecutive cycles during steady-state operation of the unit corresponding to the data reported in FIG. 2. It demonstrates the constancy of continuous product withdrawal rate and its purity during the entire cycle from the unit of FIG. 2. This can be a major advantage vis a vis a portable MOC unit which supplies the $O_2$ product discontinuously (pulsed delivery).[3]

Figure 5:
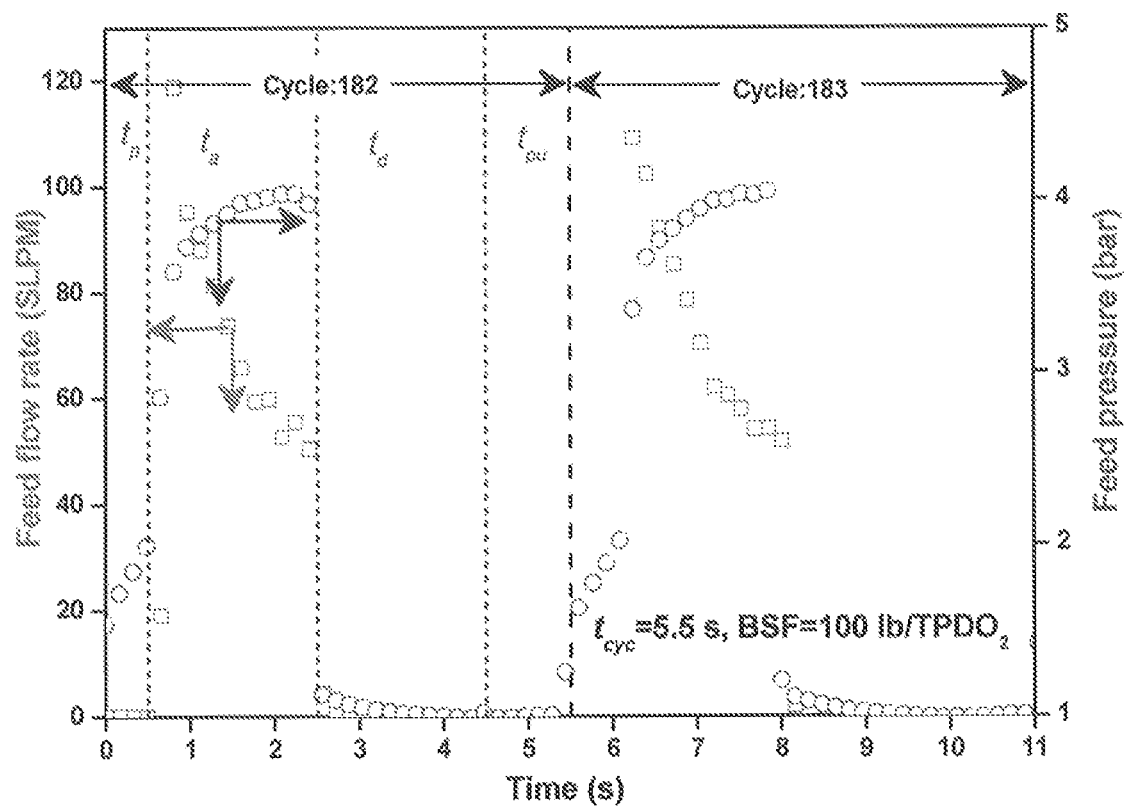
FIG. 5: Air feed flow rate and pressure profiles at the column inlet for two consecutive cycles during steady state operation at the minimum BSF condition (product pressurization) of FIG. 2.

FIG. 5 shows the net feed air flow rate and pressure as functions of time corresponding to the data reported in FIG. 2. It may be seen that the feed air flow rate is high at the start of the adsorption step and then it gradually decreases by about a factor of 3 at the end of the adsorption step. The feed air pressure progressively increases to the final adsorption pressure during that step. Thus the compressor duty changes with time during the adsorption step.

Figure 6:
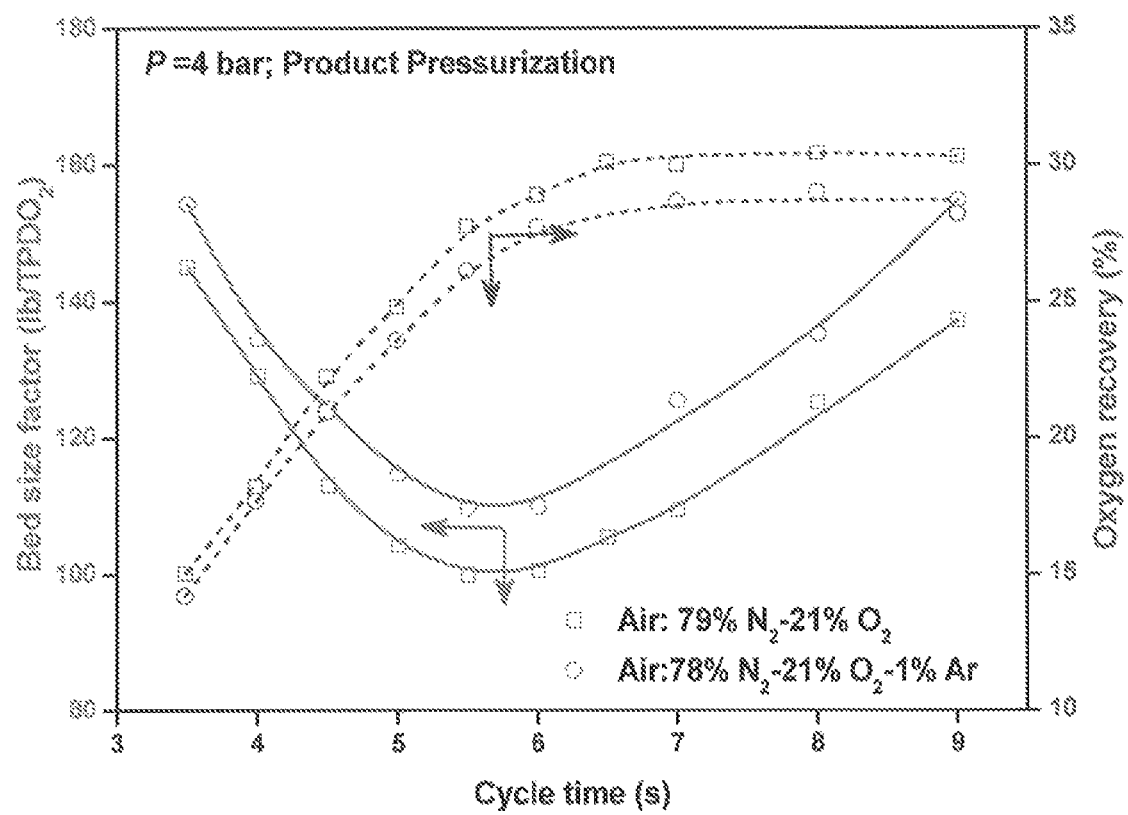
FIG. 6: Effect of Ar in feed air on performance of RPSA process with product pressurization.

FIG. 6 reports the effect of argon (~1%) in the feed air (21% $O_2$+78% $N_2$) on the RPSA process performance using identical conditions of operation as used in the data of FIG. 2. Only the product pressurization case is described. It shows that the location of the minimum of BSF vs $t_c$ plot is practically unchanged. However, the minimum value of BSF is increased from 100 to 110 lbs/TPD and the corresponding R is reduced from ~27 to 26%. In other words, the detrimental effects of presence of Ar in feed air on the process performance are rather small. The substantial performance advantages of the present system discussed earlier remains practically unchanged.

Comparative Example

A commercially-available two-column RPSA—$O_2$ generator (Invacare XP $O_2$) was also tested, which produced ~0.7-0.9 sl/m of ~90% $O_2$ in a pulsed discontinuous mode with a BSF of 200-270 lbs/TPD $O_2$ and an R of 23-29%. The total cycle time was ~10-14 seconds and a product buffer tank was used. Thus, the performance exhibited by system of Example 1 indicates that the adsorber size can potentially be reduced by a factor of 3-4 while matching or improving the $O_2$ recovery by ~20% provided that they are verified in a scaled-up, self-sustained, continuous RPSA process unit.

CONCLUSION

A compact, rapid pressure swing adsorption (RPSA) system based on a novel design concept consisting of a single adsorbed enclosed inside a gas storage vessel was constructed and successfully tested for continuous production of 1-10 Slpm of 90+% $O_2$ for medical use employing a commercial sample of pelletized LiLSX zeolite (~150 g) as the air separation sorbent and a total cycle time ($t_c$) of only 3-9 seconds. It was demonstrated that (a) the process bed size factor (BSF) cannot be indefinitely reduced by lowering $t_c$, (b) adsorbed pressurization using a part of the product gas provides a superior process performance (lower BSF and higher R) than feed air pressurization, and (c) presence of Ar in feed air increases BSF and lowers R, albeit by a small amount. The optimum process performance (BSF ~100 lbs/TPD and R~27%) were achieved using a $t_c$ of 5-6 seconds, which indicate that the designed unit is potentially capable of reducing the adsorbent inventory by a factor of 2-3 and improving the $O_2$ recovery by ~10% compared with the performance of a commercial MOC unit.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

What is claimed is:

1. An oxygen concentrating system comprising:
   an adsorption column containing an adsorbent, said column having a first end and a second end;
   a shell enclosing said column and defining a product gas storage space between said column and said shell;
   a product conduit operatively connecting said product gas storage space to a product output point;
   a first conduit operatively connecting said first end of said column to a feed point, and said first end to a waste point, said first conduit comprising at least one first valve having at least a first and second configuration, in said first configuration, compressed air flows from said feed point to said first end, and, in said second configuration, waste gas flows from said first end to said waste point; and
   a second conduit operatively connecting said second end of said column to said product gas storage space, said second conduit comprising at least one second valve having at least a first and second configuration, in said first configuration, product gas produced by said adsorption column flows from said product gas storage space to said second end, and, in said second configuration, said product gas flows from said second end to said product gas storage space.

2. The oxygen concentrating system of claim 1, further comprising a process controller configured for controlling said first and second valves to execute the following steps:
   (a) configuring at least one of said first or second valves in its respective first configuration to pressurize said column;
   (b) configuring said first valve in its first configuration and said second valve in its second configuration to feed compressed air into said column, thereby producing said product gas which flows into the storage space through said second conduit;
   (c) configuring said first valve in said second configuration to depressurize said column by venting waste gas from said column to said waste point;
   (d) configuring said second valve in said first configuration to purge said column by flowing at least a portion of said product gas through said second end of said column and venting waste gas from said column to said waste point; and
   (e) reiterating steps (a)-(d).

3. The oxygen concentrating system of claim 2, wherein steps (a)-(d) are performed in about 3 to 6 seconds.

4. The oxygen concentrating system of claim 3, wherein step (a) is performed in less than 1 second.

5. The oxygen concentrating system of claim 3, wherein step (b) is performed in about 0.5 to 2 seconds.

6. The oxygen concentrating system of claim 3, wherein step (c) is performed for at least 1 second.

7. The oxygen concentrating system of claim 3, wherein step (d) is performed for at least 1 second.

8. The oxygen concentrating system of claim 1, wherein said adsorbent comprises bound particles of LiX zeolite crystals having a particle diameter of about 300 to about 1000 micron.

9. The oxygen concentrating system of claim 8, wherein said particle diameter is about 300 to about 700 micron.

10. The oxygen concentrating system of claim 1, further comprising a desiccant at said first end.

11. The oxygen concentrating system of claim 1, wherein said system has a BSF of about 30 to about 60 lbs/TPD O2.

12. The oxygen concentrating system of claim 1, wherein said first conduit comprises a quick connect at said feed point.

13. The oxygen concentrating system of claim 1, wherein said first and second valves have a valve constants (Cv) larger than 1.5.

14. The oxygen concentrating system of claim 1, wherein said first valve comprises two or more valves.

15. The oxygen concentrating system of claim 1, wherein said second valve comprises two or more valves.

16. The oxygen concentrating system of claim 1, wherein said column has a length to diameter ratio between about 0.3 and about 2.5.

17. A method of concentrating oxygen using an oxygen concentrating device, said device having an adsorption column containing an adsorbent and having a first end and a second end, said column being enclosed by a shell to define a product gas storage space between said column and said shell; said method comprising at least the steps of:
   (a) pressurizing said column with at least one of compressed air or first product gas from said storage space;
   (b) feeding compressed air into said column thereby producing second product gas from said second end which flows into said storage space;

(c) depressurizing said column by venting waste gas from said column;

(d) purging said column by flowing a first portion of said second product gas into said second end of said column and venting waste gas from said first end;

(e) reiterating steps (a)-(d); and (f) withdrawing product gas either essentially continuously during steps (a)-(d) or intermittently.

18. The method of claim 17, wherein product gas is withdrawn essentially continuously during steps (a)-(d).

19. The method of claim 17, wherein, in step (a), the column is pressurized by said first product gas from said storage space.

20. The method of claim 17, wherein, in step (a), the column is pressurized to about 2 to about 6 atm.

21. The method of claim 17, wherein said product storage space is pressurized to about 2 to about 4 atm.

22. The method of claim 17, wherein said system has a BSF of about 30 to about 60 lbs/TPD O2, an O2 recovery value of 25-35%, a cycle time of steps (a)-(d) of about 3 to about 5 seconds, and produces no less than about 90% O2 enriched product gas.

* * * * *